Dec. 6, 1966 R. C. ABT ETAL 3,290,237
ELECTROLYTIC MATERIAL REMOVAL ELECTRODE
Filed Aug. 7, 1963
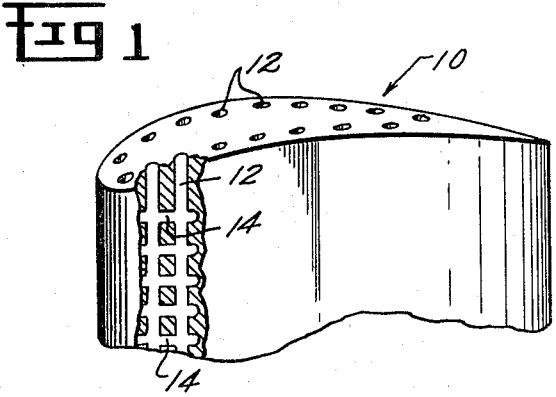
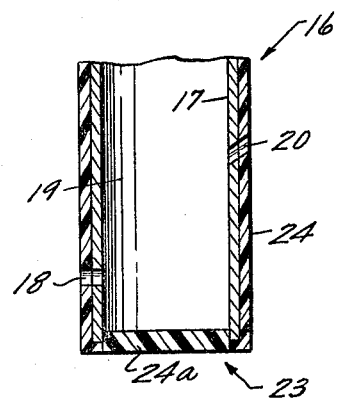
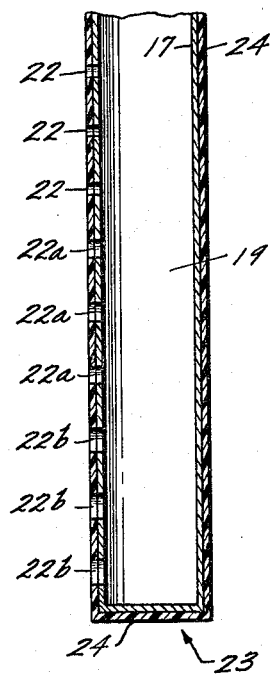
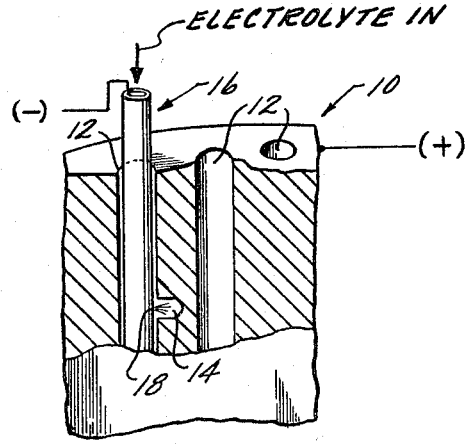
INVENTORS,
RONALD C. ABT
WILLIAM L. EISBERG, JR.
BY Lee Bacho
ATTORNEY—

United States Patent Office
3,290,237
Patented Dec. 6, 1966

3,290,237
ELECTROLYTIC MATERIAL REMOVAL ELECTRODE
Ronald C. Abt, Cincinnati, and William L. Eisberg, Jr., Wyoming, Ohio, assignors to General Electric Company, a corporation of New York
Filed Aug. 7, 1963, Ser. No. 300,456
2 Claims. (Cl. 204—224)

This invention relates to the art of electrolytic removal of a workpiece material and, more particularly, to an improved electrode and method of using.

As the aircraft gas turbine art has advanced to produce more complex, higher temperature operating devices, a need has arisen to produce component parts of such devices which can withstand such temperatures. One such component part is the turbine blade used in the hot turbine section of jet engines. One solution to the problem of high temperature resistance involved the production of longitudinal cooling fluid passages through the blade by a method and apparatus such as is described in co-pending application Serial Number 823,975 filed June 30, 1959, now abandoned, and assigned to the assignee of the present invention.

As the electrolytic material removal art progressed, such as from the work reported by Gusseff in British Patent 335,003 through such U.S. patents as 3,019,178 and 3,041,265—Williams and the above identified co-pending application, a wide variety of electrode shapes have been reported to produce large or small cavities or passages of a variety of shapes in or through a workpiece. In all of the prior art electrodes such as are meant to be introduced below the surface of the workpiece material or which are to project an electrolyzed stream toward the workpiece, such as in U.S. Patent 2,741,594—Bowersett, the opening for the electrolyte emission has always been through the end portion of the electrode which is nearer the workpiece.

Designers of turbine blading for aircraft gas turbine engines have recognized that, in addition to the individual longitudinal cooling fluid passages through the turbine blading substantially from tip to stem, it is desirable to include internal branch cooling fluid passages in the turbine blade. The branch passages emanate from and can interconnect main or longitudinal passages to provide for more efficient blade cooling. Because the size, shape and location of such branch or cross-over passages are important with regard to cooling fluid flow and temperature pattern throughout the blade, accurate dimensioning, shaping and locating of the branch passages are important.

Methods and electrodes reported prior to that of this invention were unable to produce such accurate branch passages. For example, a pipe and nozzle section as shown in Bowersett—2,741,594, when inserted in an existing passage with the nozzle section bent so that it is angularly directed toward an internal wall of the passage will flutter when electrolyte pressure is applied. Thus an accurately dimensioned branch passage is not possible to produce by such method and apparatus. Similarly, the insertion in an existing passage of known electrodes in which electrolyte flows from the end of the electrode nearer the workpiece, even if held stationary, would produce a pear shaped cavity rather than an accurately dimensioned branched passage.

It is a principal object of this invention to provide a method for producing by electrolytic material removal an accurately dimensioned branch passage emanating from an existing passage in an article.

Another object is to provide an improved electrode which can be used in such a method.

These and other objects and advantages will be more readily recognized from the following detailed description and drawing in which:

FIG. 1 is an isometric, partially sectional view of a turbine blade including an internal network of cooling fluid passages;

FIGS. 2 and 3 are fragmentary sectional views of embodiments of the present invention;

FIG. 4 is an isometric partially sectional view of the electrode of the present invention in the process of producing a branch passage such as are shown in FIG. 1.

Briefly, the method aspect of the present invention, in one form, provides for the production by electrolytic material removal of a branch passage emanating from an existing passage in an article. The branch passage is located entirely within the article and extends from and is intermediate of the ends of the existing passage. The method involves the steps of holding stationary a negatively charged hollow electrode within the existing passage in a positively charged workpiece. Then an unwavering stream of negatively charged electrolyte is directed at a pressure of at least about 14 p.s.i. from an opening in a side wall of the electrode across a gap between the workpiece and the electrode of less than about 0.02 inch. The stream impinges on a positively charged stationary internal wall of the existing passage at an area intermediate the ends of the existing passage.

The electrode, according to the present invention, is a hollow electrically conducted member having an outer surface of a dielectric material at the closed or working area portion which is inserted into the workpiece. The electrode is closed at its tip which is inserted into the workpiece, the closed tip end being coated with or being itself a dielectric material. The electrode includes an opening through its lateral wall venting its hollow inner electrolyte chamber through the lateral wall, the lateral wall extending in all directions away from the opening.

It has been recognized that an accurately dimensioned branch passage can be electrolytically produced in the side wall of an existing passage according to this invention preferably through the use of a hollow cathodic electrode shaped according to the inside wall configuration of an existing passage. When such electrode is inserted in the existing passage, the space or gap between the cathode and the internal wall of the existing passage should be no greater than about 0.02 inch. Further, it has been found that if such a hollow electrode through which electrolyte must pass has an opening in its side or lateral wall rather than in its tip end, flutter of the electrode is avoided when hydraulic electrolyte pressure is applied. Because the lateral wall of the electrode extends in all directions away from the opening, the thrust reaction from the electrolyte stream flowing from the opening in the electrode produces a thrust vector in the electrode at an angle to the axis of the electrode. This forces an outer wall of the electrode to bear on an internal wall of the existing passage holding the electrode still to provide an unwavering electrolyte stream. However, if there is a difference greater than about 0.02 inch between the outside diameter of the electrode and the inside diameter of the existing passage, the stream of electrolyte, irrespective of the size of the opening or the pressure of electrolyte, will spray over too wide an area on the internal wall of the existing passage to allow the production of an accurately dimensioned branch passage.

As was mentioned above, the method and electrode of the present invention can be used to produce branch passages from existing cooling fluid passages in turbine blading. FIG. 1 is a view of the tip portion of a turbine blade shown generally at 10. Passing longitudinally through the blade from the tip substantially to the stem are cooling fluid passages 12 which have been referred to as "existing passages." In this embodiment and in many applications, the existing passages are in the form of cylindrical holes. Interconnecting the existing passages 12 are branch or cross-over passages 14. In one application the branch passages are about 0.1 inch or less in length, and have a diameter of about 0.06 inch. Therefore it can be appreciated that the accurate locating and directing of the branch passages and the avoidance of a cone or funnel effect where the branch passage connects with the existing passage can effect the strength of the article and the characteristics of the flow of cooling fluid through the article.

The branch passages 14 of FIG. 1 can be made individually using an electrode such as 16 in FIG. 2 having a single electrode opening 18 to direct the flow from electrolyte chamber 19 substantially perpendicularly to the centerline or axis of the electrode or a single electrode opening 20 to direct the flow angularly. In another form, the electrode of FIG. 3, having a plurality of openings such as 22, 22a and 22b, can be used to produce multiple openings concurrently. All forms of the electrodes of this invention, including those shown in FIGS. 2 and 3, include an outer surface of a dielectric material 24 as a dielectric barrier between the electrically conductive portion of the electrode and the adjacent surface of the article such as in a turbine blade 10 in FIG. 1 during electrolytic material removal. The tip end of the electrode shown generally at 23 in FIGS. 2 and 3 is opposite the end at which the electrolyte is introduced into the electrolyte chamber 19 and is closed so that an electrolyte is directed under pressure through the openings such as 18 or 20 in FIG. 2 or 22, 22a and 22b in FIG. 3. In FIG. 2, dielectric plug 24a has been inserted to close the tip end of the electrode as well as to provide a dielectric barrier whereas in FIG. 3 a dielectric coating 24 completely encases the working portion of the electrolyte to provide such barrier. Thus the electrode of the present invention comprises a hollow composite member including an electrically conductive inner member 17, covered with a dielectric material 24 at its working area portion and including openings such as 18, 20, 22, etc. in the lateral wall to allow electrolyte introduced in the hollow center portion 19 to be projected outward.

In some applications involving the use of electrodes having a high length to diameter ratio and many openings, the openings in the side wall of the electrode of the present invention will increase in size as they approach the closed tip of the hollow electrode. This is shown in FIG. 3 wherein the group of openings 22 are smaller than the group of openings 22a and the group of openings 22a are smaller than the group of openings 22b. It has been found that because of the change in hydraulic pressure as the electrolyte passes through the tube toward the tip 23, this increase in the size of the openings in the side wall is necessary to produce branch passages of the same diameter. If extreme accuracy is desired, each successive opening rather than groups of openings as shown in FIG. 3, as they progress toward the closed end of the tube, can be made slightly larger according to hydraulic considerations. However, it has been found that in most applications a series of openings can be made approximately the same size without serious effect on the size and shape of the branch passage.

As can be appreciated by those skilled in the art, the size and depth of a branch passage made according to the present invention depends on the electrolyte pressure and the voltage used in the method. Under conditions such as about 25 pounds per square inch electrolyte pressure at an electrical potential of about 25 volts and using electrodes at about 0.1 inch outside diameter, branch passages up to about 0.05 inch readily can be made. However using double opposed electrodes such as might be directed one toward the other from each of the existing passages 12 shown in section in FIG. 1 to form a single branch passage, passages up to about 0.1 inch in length can be made without a cone or funnel effect in the side wall of the existing passages.

With extremely small openings, very high electrolyte pressures are required. It has been found that at electrode openings of about 0.01 inch, a minimum electrolyte pressure of about 25 p.s.i. is required. For electrode openings of about 0.02 inch an electrolyte pressure of about 14–18 p.s.i. is required. However, it was recognized expectedly that about 14 p.s.i. is the minimum electrolyte pressure which can be used in the practice of the present invention. Using larger electrode openings, such as about 0.05 inch, pressures greater than 14 p.s.i. are required to give sufficient velocity in order to avoid a cone or funnel entrance effect and to allow for substantially rapid electrolytic removal. At about 10 p.s.i. with an opening of about 0.05 inch it was found that the cone effect was too great and the electrolytic material removal was very slow. Thus the method of the present invention recognizes that there is a significant and critical electrolyte pressure effect on the production of branch passages.

In one example, using an electrode shown in FIG. 2 with the exception that no angular hole 20 was included, a branch passage was produced in a turbine blade made from a wrought nickel base alloy having a nominal composition, by weight, of 15% Cr, 3.25% Ti, 0.025% B, 4.25% Al, 17% Co, 5% Mo with the balance essentially nickel and incidental impurities. The electrically conductive portion of the electrode was a titanium tube having an outside diameter of 0.112 inch and an inside diameter of 0.102 inch. The titanium tube was coated with a 0.002 inch thick dielectric coating of a cured polytetrafluoroethylene resin one form of which is known commercially as "Teflon" with the tip of the tube plugged with the same dielectric, as shown in FIG. 2. Although this resin was used in this example, other dielectric materials and resins, such as a cured epoxy resin can be used as well. An aqueous solution of about 11 weight percent sulfuric acid as the electrolylte was introduced into the hollow electrolylte chamber of the electrode which was held stationary inside an existing passage 12 as in FIG. 4. The electrolyte was maintained at a pressure of 20–25 p.s.i. at a temperature of 110° F. After a potential of 25 volts was impressed between the electrode and blade to charge the electrode negatively and the turbine blade positively, a branch passage of 0.06 inch in length was produced in about 3 minutes. At the start of the process the current flowing was about 2 amps but decreased as the branch passage was formed.

In another example, the same size and type of tube, dielectrically coated and plugged in the same manner as above but including a series of openings as shown in FIG. 3, was used to produce, concurrently, a series of branch passages. The same conditions and time as in the above example were used. In this instance the electrode included 16 holes which were divided into three diameter groups: 0.010" for the top most holes, 0.014" for the middle holes and 0.020" for the bottom holes nearest the tip. It has been found that in using electrodes of this invention with multiple openings in the lateral wall to produce concurrently, multiple branch passages, a minimum potential of 18 volts is required. At lower voltages, inaccurate passages with substantial entrance or cone effects are produced because of the excessive time required. Furthermore, with multiple openings at least about 20 p.s.i. electrolyte pressure must be used.

In the above example, and in general practice, the time of electrolytic material removal operation is generally limited closely to that required to produce the length of branch passage desired. Thus just after the branch passage achieves its desired length or breaks through to another existing passage, the process is generally terminated. However, in the event it is not desirable or practical to stop processing at a time as closely as might be desired, a dummy core can be placed in the adjacent existing passage into which a branch passage will be electrolytically machined. The dummy core will block any electrolytic material removal in such branch passage. Further, if desirable for special applications, nozzle inserts can be placed in the openings 18 or 20 in an electrode such as in FIG. 2, particularly if angularly directed openings are desired in very thin walled electrodes.

As was pointed out in co-pending application Serial No. 288,975 filed June 19, 1963, and assigned to the assignee of this invention, in certain instances it is desirable and essential for long electrode life to eliminate wear of dielectric material at the tip or lateral wall portions of the electrode. Such wear can be caused by electrolyte erosion as well as mechanical abrasion. It is contemplated that an uncharged outer metallic portion electrically insulated from the current carrying inner portion of the electrode of the present invention can be used according to such co-pending application.

The method of the present invention contemplates a gap or tolerance difference of less than about 0.02" between the outer cross-sectional dimension of the electrode and the inner cross-sectional dimension of the existing passage for producing branch passages with a small or negligible entrance or cone effect. However, it is preferred that such a dimension difference be less than about 0.005" for straight branch passage having a minimum entrance effect. The method and the electrode of the present invention can be used readily for producing straight branch or cross-over passages with minimum entrance effect in webs or partitions ranging in thickness from 0.001 to 0.120". With the use of very high pressures and voltages and with the use of double opposed electrodes to produce the same branch passage, considerably longer passages can be produced according to the present invention. One distinctive advantage of the present invention is that it can be used in production to connect holes so small, for example, 0.030" inside diameter, and at such a depth that no other practical method can be used.

Although the present invention has been described in connection with specific examples, it will be recognized by those skilled in the art of electrolytic material removal the variations and modifications of which the present invention is capable.

What is claimed is:
1. In an apparatus for use in electrolytic machining a metal workpiece the apparatus including: means for connecting said workpiece to make said workpiece predominantly anodic, a hollow electrode for machining said workpiece, means connected to said electrode for making said electrode predominantly cathodic relative to said workpiece and means for circulating electrolyte through said electrode, the improvement wherein said electrode comprises:
   a hollow electrically conductive member including
      (a) a tip end portion;
      (b) an electrolyte inlet portion; and
      (c) an electrically conductive side wall connected between the tip end portion and the electrolyte inlet portion;
   the side wall, tip end portion and electrolyte inlet portion together defining an electrolyte chamber;
   the outer surface of the side wall and the tip portion being a dielectric material; and
   an opening through the side wall and the dielectric material communicating with the electrolyte chamber.

2. The apparatus of claim 1 in which there are a plurality of openings through the side wall and the dielectric material each communicating with the electrolyte chamber.

References Cited by the Examiner

UNITED STATES PATENTS

| | | | |
|---|---|---|---|
| 3,019,178 | 1/1962 | Williams | 204—284 |
| 3,035,998 | 5/1962 | Sommer et al. | 204—284 |
| 3,036,962 | 5/1962 | McNutt | 204—143 |
| 3,056,734 | 10/1962 | Scott | 204—143 |
| 3,058,895 | 10/1962 | Williams | 204—284 |

FOREIGN PATENTS 335,003  9/1930  Great Britain.

JOHN H. MACK, *Primary Examiner.*

JOHN R. SPECK, R. L. GOOCH, R. MIHALEK,
*Assistant Examiners.*